United States Patent
Griessl et al.

(10) Patent No.: US 12,506,189 B2
(45) Date of Patent: Dec. 23, 2025

(54) METHOD FOR SEPARATING OR RECOVERING MATERIALS FROM ELECTRODES, METHOD FOR PRODUCING AN ELECTRODE, AND ELECTRODE

(71) Applicant: Bayerische Motoren Werke Aktiengesellschaft, Munich (DE)

(72) Inventors: Desiree Griessl, Munich (DE); Martin Hiller, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 9 days.

(21) Appl. No.: 18/271,507

(22) PCT Filed: Feb. 16, 2022

(86) PCT No.: PCT/EP2022/053720
§ 371 (c)(1),
(2) Date: Jul. 10, 2023

(87) PCT Pub. No.: WO2022/189104
PCT Pub. Date: Sep. 15, 2022

(65) Prior Publication Data
US 2024/0063452 A1   Feb. 22, 2024

(30) Foreign Application Priority Data

Mar. 10, 2021   (DE) .................. 10 2021 105 761.2

(51) Int. Cl.
*H01M 10/54*       (2006.01)
*B24C 1/00*        (2006.01)
(Continued)

(52) U.S. Cl.
CPC ............. *H01M 10/54* (2013.01); *B24C 1/003* (2013.01); *B24C 3/322* (2013.01); *H01M 4/0404* (2013.01); *H01M 4/0435* (2013.01)

(58) Field of Classification Search
CPC .. H01M 10/54; H01M 4/0404; H01M 4/0435; B24C 1/003; B24C 3/322
(Continued)

(56) References Cited

U.S. PATENT DOCUMENTS 4,924,643 A * 5/1990 Buiguez .................. B24C 11/00
                                                          451/39
6,180,278 B1   1/2001 Prickett et al.
(Continued)

FOREIGN PATENT DOCUMENTS

DE        699 05 134 T2   10/2003
DE    10 2012 214 800 A1   2/2014
(Continued)

OTHER PUBLICATIONS

International Search Report (PCT/ISA/210) issued in PCT Application No. PCT/EP2022/053720 dated Jun. 14, 2022 with English translation (6 pages).
(Continued)

*Primary Examiner* — Brian K Talbot
(74) *Attorney, Agent, or Firm* — Crowell & Moring LLP

(57) ABSTRACT

A method for separating or recovering materials from electrodes includes: providing a substrate, in particular an electrode substrate, to which a coating has been applied; and at least partially stripping the coating from the substrate by snow blasting.

8 Claims, 1 Drawing Sheet

(51) Int. Cl.
*B24C 3/32* (2006.01)
*H01M 4/04* (2006.01)

(58) Field of Classification Search
USPC .................................................. 427/58, 115
See application file for complete search history.

(56) References Cited

U.S. PATENT DOCUMENTS

| | | | | |
|---|---|---|---|---|
| 8,497,030 | B2* | 7/2013 | Sloop | H01M 10/30 |
| | | | | 429/49 |
| 9,484,606 | B1* | 11/2016 | Sloop | H01M 10/54 |
| 10,293,465 | B2* | 5/2019 | Popeck | B24C 1/04 |
| 12,021,206 | B2* | 6/2024 | Yue | C01B 25/45 |
| 2003/0104764 | A1* | 6/2003 | Preising | B24C 3/322 |
| | | | | 451/39 |
| 2003/0207655 | A1* | 11/2003 | Jackson | B24C 1/003 |
| | | | | 451/38 |
| 2008/0178907 | A1* | 7/2008 | Duda | B24C 1/003 |
| | | | | 134/1.1 |
| 2009/0286137 | A1* | 11/2009 | Sloop | H01M 10/54 |
| | | | | 429/50 |
| 2010/0146761 | A1* | 6/2010 | Sloop | H01M 10/54 |
| | | | | 29/403.3 |
| 2013/0040538 | A1* | 2/2013 | Scrivani | B24C 1/003 |
| | | | | 451/39 |
| 2016/0279836 | A1* | 9/2016 | Schmand | B24C 1/003 |
| 2019/0143484 | A1* | 5/2019 | Gensewich | B24C 9/003 |
| | | | | 451/39 |
| 2021/0280393 | A1* | 9/2021 | Shih | B24C 3/32 |
| 2021/0344058 | A1* | 11/2021 | Liu | C22B 15/0052 |
| 2024/0204278 | A1* | 6/2024 | Yu | H01M 4/0416 |
| 2024/0274909 | A1* | 8/2024 | Yokoyama | C22B 7/005 |
| 2024/0274910 | A1* | 8/2024 | Yokoyama | H01M 10/54 |

FOREIGN PATENT DOCUMENTS

| | | | | | |
|---|---|---|---|---|---|
| DE | 102021133110 | A1 | * | 6/2023 | ............. B24C 1/003 |
| JP | S57-148875 | A | | 9/1982 | |
| JP | H10-335177 | A | | 12/1998 | |
| JP | 2001-47364 | A | | 2/2001 | |
| JP | 2002-127014 | A | | 5/2002 | |
| JP | 2006095367 | A | * | 4/2006 | |
| KR | 20210022030 | A | * | 3/2021 | ............. B24C 1/003 |
| WO | WO-0005777 | A1 | * | 2/2000 | ............. H01M 10/54 |
| WO | WO 2016/022858 | A1 | | 2/2016 | |

OTHER PUBLICATIONS

German-language Written Opinion (PCT/ISA/237) issued in PCT Application No. PCT/EP2022/053720 dated Jun. 14, 2022 (7 pages).
German-language Search Report issued in German Application No. 10 2021 105 761.2 dated Jan. 24, 2022 with partial English translation (10 pages).

* cited by examiner

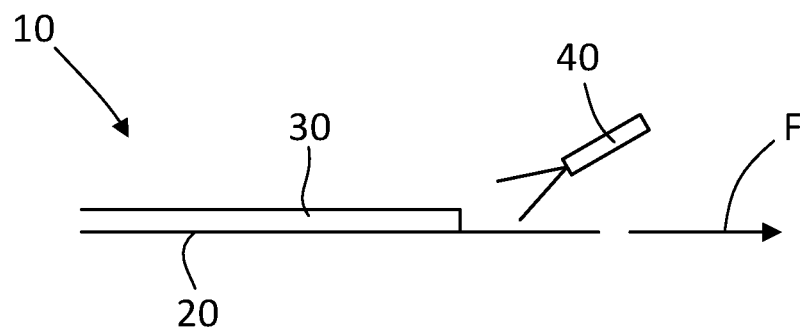

METHOD FOR SEPARATING OR RECOVERING MATERIALS FROM ELECTRODES, METHOD FOR PRODUCING AN ELECTRODE, AND ELECTRODE

BACKGROUND AND SUMMARY

The present invention relates to a method for separating or recovering materials from electrodes, a method for producing an electrode, and an electrode.

High-value materials are used to produce electrical energy storage cells. It is beneficial to find solutions for reusing or recycling these materials. Waste sometimes occurs during production of energy storage cells, which is detrimental because of cost and environmental aspects. However, the recovery of individual materials is often difficult, since different materials may be fixedly connected to one another. For example, the carrier films of electrical energy storage cells may be provided with a coating, which adheres strongly thereto and cannot be readily removed. To separate electrode substrate plates and the coating, DE 699 05 134 T2 proposes detaching the coating by bending the coated substrate with a sufficiently small bending radius. In addition, working with solvents, etc. is proposed therein. However, bending is not successful with flexible coatings. The use of solvents, etc. results in a high facility expenditure.

It is therefore an object of the present disclosure in particular to specify a method for separating or recovering materials, in particular in the field of battery technology, which is to be applied flexibly and is implemented with low expenditure and thus also enables advantages for electrode manufacturing.

This object may be achieved by a method and an electrode according to the independent claims. Further advantages and features result from the dependent claims and the description and the appended FIGURE.

According to this disclosure, a method for separating or recovering materials from electrodes comprises the following steps: providing a substrate, in particular a carrier material of an electrode, on which a coating is applied on one or both sides; and removing the coating at least in some areas by snow blasting.

Snow blasting is a compressed air blasting method, in which carbon dioxide is used as a blasting medium. Therefore, it is also designated as $CO_2$ snow blasting. It is essentially possible to distinguish two method variants. In the two-material ring nozzle variant, liquid carbon dioxide is expanded at the nozzle outlet at ambient temperature. The resulting $CO_2$ snow particles are bundled and accelerated by a jacketed jet of supersonic compressed air. This method variant is less abrasive due to the low kinetic energy of the particles. In the second $CO_2$ snow blasting variant, liquid carbon dioxide is metered to the compressed air flow in an expansion chamber, the so-called agglomeration chamber. Larger $CO_2$ snow particles result in comparison to the two-material ring nozzle variant, which, accelerated using the compressed air in a downstream nozzle, may result in a (significantly) higher abrasiveness. In the present case, both variants can be used, possibly also in combination. Snow blasting is an extremely environmentally-gentle and resource-conserving cleaning method.

The substrate may be in particular a carrier material of an electrode of an electrical energy storage cell. The carrier material may comprise in particular an aluminum or copper foil, for example, as is used in lithium-ion batteries. The carrier material can be coated on one or both sides. The coating material may comprise, for example, active material, conductive carbon black, solvent, binder, and/or additives. To set a porosity of the coating, the coated carrier materials may be compacted, for example in a calendar. The snow blasting cleaning can expediently be carried out before and/or after the compaction of the coating. The abrasion performance can expediently be adapted individually. Thus, for example, the abrasion performance may have to be higher if the carrier material has already been compacted, since then the adhesion of the coating is possibly higher. It also has to be taken into consideration whether the coating is already dry or not. The adhesion is also then possibly greater and the abrasion performance in the snow blasting may be adapted accordingly. However, this is advantageously flexibly possible via the setting of the device parameters.

According to one embodiment, the method comprises the following step: removing and/or collecting the coating material removed from the substrate by suction.

According to one preferred embodiment, a chamber or the like is provided, in which means for snow blasting cleaning are arranged or provided. The chamber is expediently closed or closable airtight to the outside. The cleaning is advantageously carried out within the chamber. The coating material removed from the substrate can expediently be collected via suitably designed suction.

According to one embodiment, the substrates to be cleaned are continuously fed to the chamber. Multiple rows of blasting nozzles (or "spray lances") can be arranged before and/or after one another therein, possibly fixed in place. Alternatively, one or more blasting nozzles is or are also fastened on a robot arm, so that their movement/alignment can be flexibly controlled. The substrates or the substrate can themselves be in motion or can also be stationary during the cleaning process.

According to one preferred embodiment, the method is used in the context of the production of electrical energy storage cells, in particular, for example, in electrical energy storage cells, in particular lithium-ion cells, as are used for motor vehicles. The discard rates can be successfully reduced in particular in this case.

According to one embodiment, the coating is removed over the entire surface. This is expedient in particular if the or an electrode as such is to be dismantled into its components.

According to one embodiment, the material removal takes place selectively. A coating or an area of a coating can advantageously be contoured or shaped, for example. Coating material can advantageously be applied over the entire surface of the carrier film, for example. Two coating strips, alternatively also more, can be generated, for example, by a centrally introduced material removal along a web direction of the carrier film. The material removal can also take place transversely to the web direction in order to generate an intermittent coating, comprising a plurality of coating areas or sections, along the web direction.

Furthermore, the material removal can alternatively take place after compaction of the carrier film, which is coated over the entire surface in particular, in order to subsequently generate the abovementioned strips or areas or sections. This can facilitate the compaction process.

According to one embodiment, the method comprises the following steps: purifying and preparing the removed coating or the coating material removed from the substrate; and at least partially using the purified and/or prepared coating material for coating a carrier material for production, in particular of an electrical energy storage cell.

According to one embodiment, the removed coating is reused as a whole. As already mentioned, the coating comprises, for example, the materials: active material, conductive carbon black, solvent, binder, and additives. The removed coating material is possibly also subjected to a purification method if necessary. Additionally or alternatively, the coating material can also be prepared.

Preparation may be understood as a material separation, for example. Individual ones of the abovementioned materials can thus be separated, wherein this list is only to be understood as an example, in order to be able to further use them separately and in isolated form.

According to one embodiment, the preparation comprises crushing, in particular pulverizing, the coating material removed from the substrate.

According to one embodiment, the method comprises the following step: feeding prepared material to a mixing process to generate recycled coating material, in particular for an electrode of a lithium-ion cell.

According to one preferred embodiment, the abovementioned powdered components are again supplied to the mixing process.

According to one embodiment, the method comprises the following step: using the stripped carrier material for production, in particular of an electrical energy storage cell.

The carrier material can advantageously thus (also) be reused. According to one embodiment of the method, it is used to produce the same energy storage cell, thus to produce an energy storage cell of the same type. Alternatively, the carrier material can also be used for another battery type, for example for a battery type on which lower performance requirements are placed. Alternatively, the use for a battery type of a different size can be preferred, so that the carrier material still can or has to be trimmed, for example, due to which damaged areas or areas which could not be completely freed of coating material can be removed if necessary.

This disclosure also relates to a method for producing an electrode for an energy storage cell, wherein the method according to the invention is used to separate or recover materials.

The method advantageously comprises the following step: partially removing the coating for its shaping.

The advantages and options in conjunction with the partial removal were already described. Alternatively, the method is used in the context of the production of an electrode for an energy storage cell to dismantle electrodes declared as discards into their components.

The invention also relates to an electrode comprising a carrier film and/or coating material, which was produced according to the method according to the invention for production. The method can expediently be used both for classic recycling, for example of battery cells, thus with used battery cells. However, the method can advantageously also be used in the context of production to reduce the discard rates and/or to optimize the production process.

Further advantages and features result from the following description of a method with reference to the appended FIGURE.

BRIEF DESCRIPTION OF THE FIGURE

In the figure:

FIG. 1: shows a diagram to illustrate an embodiment of the method.

DETAILED DESCRIPTION OF THE FIGURE

FIG. 1 shows a schematic view of an electrode 10 comprising a substrate 20, in particular a carrier material, such as an aluminum foil or a copper foil, having a coating 30 arranged thereon. The coating 30 is removed from the substrate 20 by $CO_2$ snow blasting. This is indicated via the schematic spray lance, which has the reference sign 40. In the present case, it is shown that the carrier material 20 is moved along a conveyance direction F. The spray lance 40 is arranged fixed in place, for example. The angle of the spray lance 40 relative to the carrier material 20 can be adjusted if needed. According to one embodiment, multiple such spray lances are provided along the conveyance direction F. Additionally or alternatively, multiple spray lances 40 are provided adjacent to one another. Furthermore, one such spray lance 40 can alternatively also be fastened on an industrial robot, so that its alignment and position relative to the carrier material 20 can be adapted as desired. The carrier material 20 can also be transported along the conveyance direction F in this case. Alternatively, it can also rest.

LIST OF REFERENCE SIGNS 10 electrode
20 substrate, carrier material
30 coating
40 spray lance
F conveyance direction

The invention claimed is:

1. A method for separating or recovering materials from electrodes, the method comprising:
   providing a substrate including a coating thereon, the substrate comprising a carrier material of a first electrode;
   producing accelerated $CO_2$ snow particles by snow blasting;
   exposing the coating to the accelerated $CO_2$ snow particles and selectively removing coating material from some areas of the substrate, a first portion of the coating being removed while a second portion of the coating remains on the substrate;
   after exposing the coating to the accelerated $CO_2$ snow particles, compacting the coating for production of the first electrode;
   producing purified and/or prepared coating material from the coating material removed from the substrate; and
   utilizing some or all of the purified and/or prepared coating material to coat another carrier material for production of a second electrode.

2. The method according to claim 1, further comprising:
   collecting the coating material removed from the substrate by suctioning.

3. The method according to claim 1, wherein
   producing the purified and/or prepared coating material comprises material separation, whereby active material, conductive carbon black, solvent, binder, and/or additives are separated from the coating material removed from the substrate.

4. The method according to claim 1, wherein
   producing the purified and/or prepared coating material comprises crushing and/or pulverizing the coating material removed from the substrate.

5. The method according to claim 1, further comprising:
   feeding the purified and/or prepared coating material to a mixing process to generate a recycled coating material.

6. The method according to claim 1, further comprising one or more blasting nozzles fixed in place or fastened on a movable robot arm for producing the accelerated $CO_2$ snow particles.

7. The method according to claim 1, wherein the substrate is continuously fed into a chamber for removal of the coating material.

8. The method according to claim 1, wherein the substrate is stationary during removal of the coating material.

\* \* \* \* \*